(12) United States Patent
Alessandrini et al.

(10) Patent No.: US 8,851,497 B2
(45) Date of Patent: Oct. 7, 2014

(54) SUPPORT FOR BICYCLE SADDLE

(76) Inventors: Alberto Alessandrini, Rimini (IT); Edo Mancini, Gemmano (IT)

( * ) Notice: Subject to any disclaimer, the term of this patent is extended or adjusted under 35 U.S.C. 154(b) by 34 days.

(21) Appl. No.: 13/698,325

(22) PCT Filed: May 16, 2011

(86) PCT No.: PCT/EP2011/057845
§ 371 (c)(1),
(2), (4) Date: Nov. 16, 2012

(87) PCT Pub. No.: WO2011/144556
PCT Pub. Date: Nov. 24, 2011

(65) Prior Publication Data
US 2013/0056953 A1    Mar. 7, 2013

(30) Foreign Application Priority Data
May 17, 2010   (IT) ............................... BO2010A0308

(51) Int. Cl.
*B62K 19/36* (2006.01)
(52) U.S. Cl.
CPC ..................................... *B62K 19/36* (2013.01)
USPC .......................................................... 280/283
(58) Field of Classification Search
CPC .............................. B62K 19/36; B62K 19/30
USPC ......................................... 280/283, 287, 275
See application file for complete search history.

(56) References Cited

U.S. PATENT DOCUMENTS

| 7,681,899 | B2 | 3/2010 | Fujiwara |
| 7,828,313 | B1 * | 11/2010 | Cienfuegos ................ 280/281.1 |
| 8,128,306 | B2 * | 3/2012 | Gorza ......................... 403/109.3 |
| 2009/0238635 | A1 * | 9/2009 | Mankadi .................... 403/109.3 |
| 2013/0307299 | A1 * | 11/2013 | Winefordner et al. ... 297/215.13 |

FOREIGN PATENT DOCUMENTS

| EP | 2025585 A1 | 2/2009 |
| GB | 1 112 516 A | 5/1968 |
| JP | 53 036840 A | 4/1978 |
| JP | 62 022184 U | 2/1987 |
| JP | 2006154498 A | 4/2008 |
| NL | 8 400 540 A | 9/1985 |

OTHER PUBLICATIONS

Machine translation of NL 8400540, Wilbrink, Ferdinand Leonard, Sep. 16, 1985.*

* cited by examiner

*Primary Examiner* — Kevin Hurley
(74) *Attorney, Agent, or Firm* — McGlew & Tuttle, P.C.

(57) ABSTRACT

The support for bicycle saddle comprises a support rod (20), connected at its upper part to the saddle (10) and engaged slidingly in a lower support element (30), rigidly fixed to the bicycle frame (40); an actuator member (60) suitable to exert a thrust force on the rod (20) in axial direction, said actuator member (60) being housed inside said frame (40), at the lower part of the rod (20); a blocking member (50), integral to said lower support element (30) and suitable to fix the position of said rod (20) in a configuration chosen by the cyclist.

12 Claims, 7 Drawing Sheets

SUPPORT FOR BICYCLE SADDLE

TECHNICAL FIELD

The present invention regards a support adjustable in height for the sitting of the driver of road vehicles, in particular for the saddle of the bicycles.

BACKGROUND ART

Support adjustable in height for bicycle saddles have been known nowadays. Such devices comprise a short tube, which can be inserted in the bicycle frame and integral to the saddle on which the cyclist sits, and a blocking means, articulated to the bicycle frame and suitable to maintain the device in the configuration desired by the user.

The blocking means of the known type usually comprise a clamp, integral to the bicycle frame, on which is engaged the short tube of the saddle. The clamp is tightened around the short tube by means of a bolt and a nut.

To make the clamp opening and closing operations easier, the use of a lever, articulated to the bolt, having a length sufficient to allow the unblocking and the hand tightening of the coupling, without requiring the use of keys or of other instruments, has been known.

Practically, the set up of the saddle is obtained loosening the bolt acting on the opening lever, and lowering or rising by hand the saddle according to the necessity. One thus proceeds again to the tightening of the coupling through the lever articulated to the clamp.

The greatest drawback of these supports lays in the impossibility of varying the inclination of the saddle while the vehicle is moving.

Another drawback consists of the time wasted for the operation of adjusting the height of the saddle. Such adjustment, according to the path and the position of the cyclist, is often useful for riding the vehicle.

In fact, as it is known, during braking and stop operations or downhill riding, it is preferable to maintain the saddle in a lower position, wherein the cyclist can easily lean both feet on the ground with ease and in a safe way.

Vice versa, during the pedalling, and in particular in the uphill tracts of path, a raised position results more comfortable, wherein the cyclist can extend as much as possible the legs during the movement.

Nevertheless, because of the impossibility of performing an adjustment of the height of the saddle during the movement of the vehicle, the cyclist is forced to search for a compromise solution, setting a prefixed position before undertaking the envisaged path.

In order to try to solve the described problem, numerous solutions have been proposed, but such solutions did not achieve a wide success in the market, because of the building complications, of the high cost and of the scarce functional efficiency obtained.

For example, the Japanese patent application JP 2006154498, on behalf FUJIWARA, describes a lifting device for bicycle saddle, comprising first support means, connected at its upper part to the saddle, and second support means, connected at its lower part to the bicycle frame. Said first and second support means are linked through a couple of small arms centrally articulated to an elastic contrast member, for example a torsion spring, suitable to exert a thrust force to reciprocally put said first and second support means apart. The thrust exerted by the elastic contrast member is adjustable, for example acting on preload screw means.

Said elastic contrast member also provides suitable blocking means, controlled by hand. The blocking means are of the ratchet gear type, wherein the arrest teeth are linked to a control device, which can be controlled by the cyclist even when the bicycle is moving.

In particular, the control device is able to selectively define two positions of the blocking means: a first position suitable to allow the rotation of the central articulation in one only direction, which determines the reciprocal setting apart of the first and second support means; and a second position suitable to allow the rotation of the central articulation only in the opposite direction, which determines the reciprocal approach of the first and second support means.

Practically, when the cyclist handles the bicycle in movement, he unloads the saddle from his own weight standing up on the pedals, and acts on the control device, selecting the first position. Successively, under the thrust exerted by the elastic contrast member, the saddle moves in a raised position.

Vice versa when the cyclist is slowing down, is riding downhill or is close to the stop of the vehicle, he acts on the control device selecting the second position, remaining sitting on the saddle. In this way, the saddle lowers, moving in a lowered position, under the action of the weight of the cyclist which weighs on the saddle, which overcomes the contrast action exerted by the spring in the opposite direction.

Numerous attempts of improving the described device have been proposed. As an example, the European patent application EP 07738412.1 discloses some improvements, which concern in particular the adjustment of the force exerted by the elastic contrast member.

Nevertheless, it is observed that the de vices of the described type have some defects inherent to their particular conformation.

In fact, the solution of using two centrally articulated small arms determines a high total encumbrance of the device. This is also due to the necessity of enabling the transverse displacement of the small arms and of the central articulation block, during the axial movement of the saddle upwards or downwards.

Moreover, the central articulation block comprises costly mechanical contrivances, delicate and subject to high wear and tear. Therefore, the described device is not suitable to equip the bicycles of common use, which require cheap and robust instruments.

Japanese patent JP 53 036840 on behalf AOKI EIZOU describes a support for bicycle saddle comprising a support small rod, connected at the upper part to the saddle and engaged slidingly in a lower support element, rigidly fixed to the frame of the bicycle; an actuator member suitable to exert a thrust force on the rod in axial direction, said actuator member being housed inside said frame, at the lower part of the rod; a blocking member, integral to said lower support element and suitable to fix the position of said rod in a configuration chosen by the cyclist.

Yet, such solution has not proven to be efficient, in particular because of the conformation of the blocking member, which has not revealed to be able to block in a stable manner the vertical sliding of the rod, simultaneously ensuring an easy unblocking of the device when necessary. In other words, the described device, and the numerous variants thereof which have been proposed, have the drawback of not managing to completely block the saddle, which successively lowers when going under effect of the weight of the cyclist, or have the drawback of not allowing to easily disengage the rod when the cyclist acts on the device to vary the height of the saddle.

DISCLOSURE

The task of the present invention is that of solving the aforementioned problems, devising a support for bicycle saddle which allows to perform in a fast and efficient manner the adjustment of the height of the sitting of the cyclist while the vehicle is moving.

Within such task, it is a further scope of the present invention that of providing an apparatus of simple building and functional conception, provided with securely reliable functioning, versatile use, as well as relatively economic cost.

The above mentioned scopes are attained, according to the present invention, by the support for bicycle saddle according to claim 1.

In particular, the invention provides a blocking member comprising a tilting body provided with a varying (i.e. not uniform) profile contact surface. Preferably, the contact surface has a first lower portion with a constant curvature and a second upper portion with a decreasing curvature. Such conformation advantageously enables to block in position the axis of the saddle also when a play is present between the surfaces which must be in contact in blocking position, simultaneously maintaining the blocking member easy to disengage in any condition.

DESCRIPTION OF DRAWINGS

Details of the invention shall be more apparent from the detailed description of a preferred embodiment of the support for bicycle saddle according to the invention, illustrated for indicative purposes in the attached drawings, wherein.

BEST MODE

With particular reference to such figures, the support for the saddle 10 of a bicycle according to the invention is indicated in its entirety with 1.

Figure 17A:
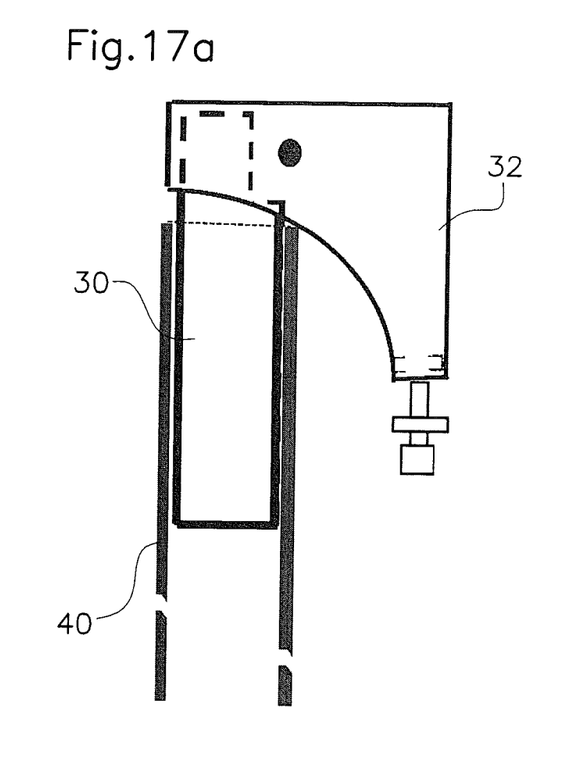
FIG. 17a shows an embodiment of the invention wherein the lower support element 30 is fixed to the frame 40 of the bicycle.
Figure 17B:
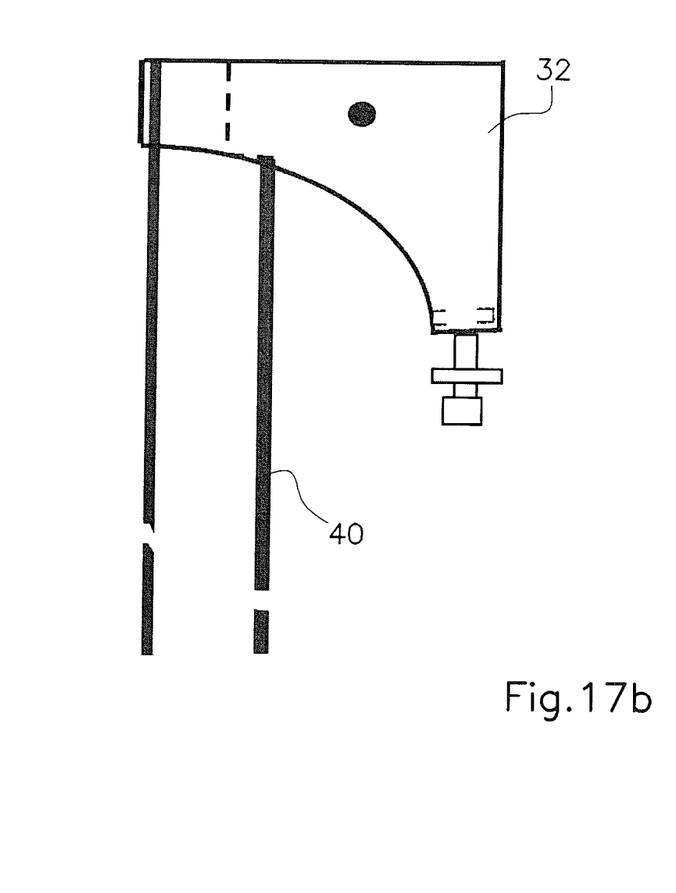
FIG. 17b shows a different embodiment of the invention wherein the lower support element 30 is shaped integral to the frame 40 of the bicycle.

The support 1 provides a support rod 20, or small tube of the saddle, connected at its upper part to the saddle 10, by means of an articulation of known type. The rod 20 is engaged slidingly in a lower support element 30, rigidly fixed to the bicycle frame 40 (see FIG. 17a). The lower support element 30 can also be made integral to the same frame 40 of the bicycle (FIG. 17b).

The rod 20 provides at least one end tubular portion 21, for example having a polygonal section. The polygonal section portion 21 can extend for the entire length of the rod 20.

Figure 6:
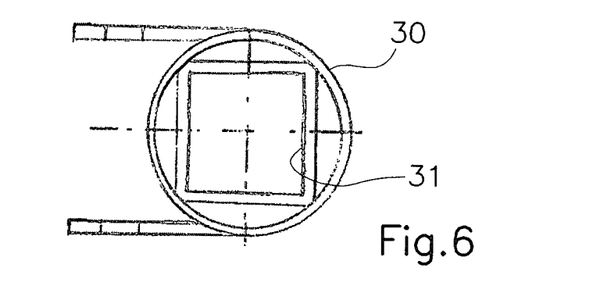
FIG. 6 shows a plan view of the lower support.

The lower support element 30 shapes a tubular sleeve, and has internally, in its upper part, a profile 31, for example polygonal, complementary to the profile of the portion 21. The end portion 21 is suitable to be engaged slidingly in the polygonal profile 31. For example, in an embodiment of the invention, the end portion 21 and the profile 31 have a square section (see in particular FIG. 6).

Figure 7:
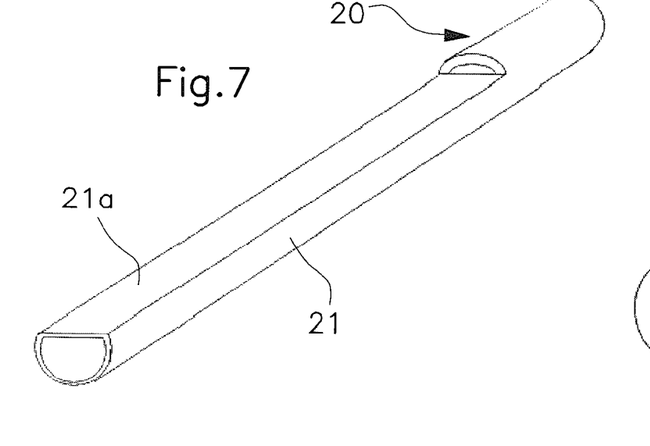
FIG. 7 shows an axonometric view of a particular embodiment of the support rod.

In a further embodiment of the invention, the end tubular portion 21 of the rod 20 shapes, in section, a circular segment (FIG. 7). As a consequence, the portion 21 has laterally a flat surface 21a. In this embodiment, the upper part 31 of the support 30 has a circular profile, suitable to be coupled to the portion 21 of the rod 20 (see in particular FIGS. 7 and 8).

Figure 14:
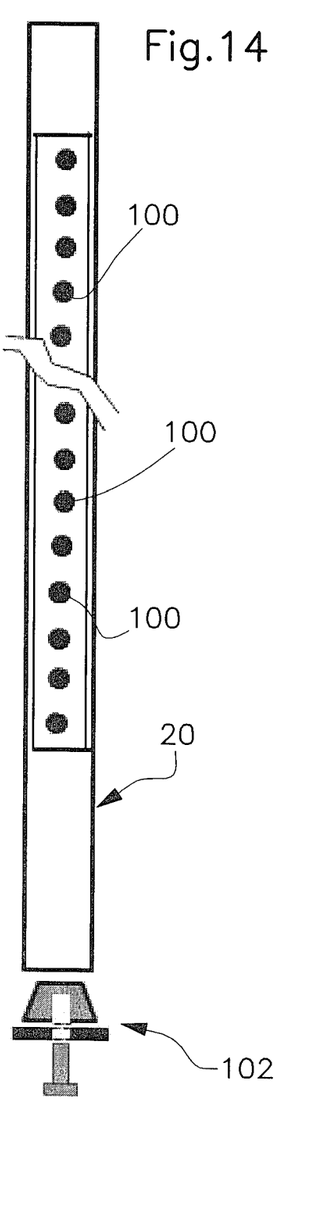
FIG. 14 shows a side view of a particular embodiment of the rod 20.

In a further variant of the invention, the flat lateral surface 21a is provided with a plurality of seats 100, for example holes or slots, suitable to receive an interference member 101, for example a pin, suitable to be inserted in one of the holes 100, as will be better illustrated hereafter (FIG. 14).

The rod 20 can be usefully equipped, at its lower end, with a closing member 102, for example consisting of a cap which externally carries a washer. The closing member 102 easily allows the centring of the rod 20 in the frame 40 of the bicycle, thanks to the protruding of the edge of the washer with respect to the lateral surface of the rod 20. The closing member 102 also usefully shapes a lower flat abutment surface for an actuator member 60, as described hereafter.

Figure 1:
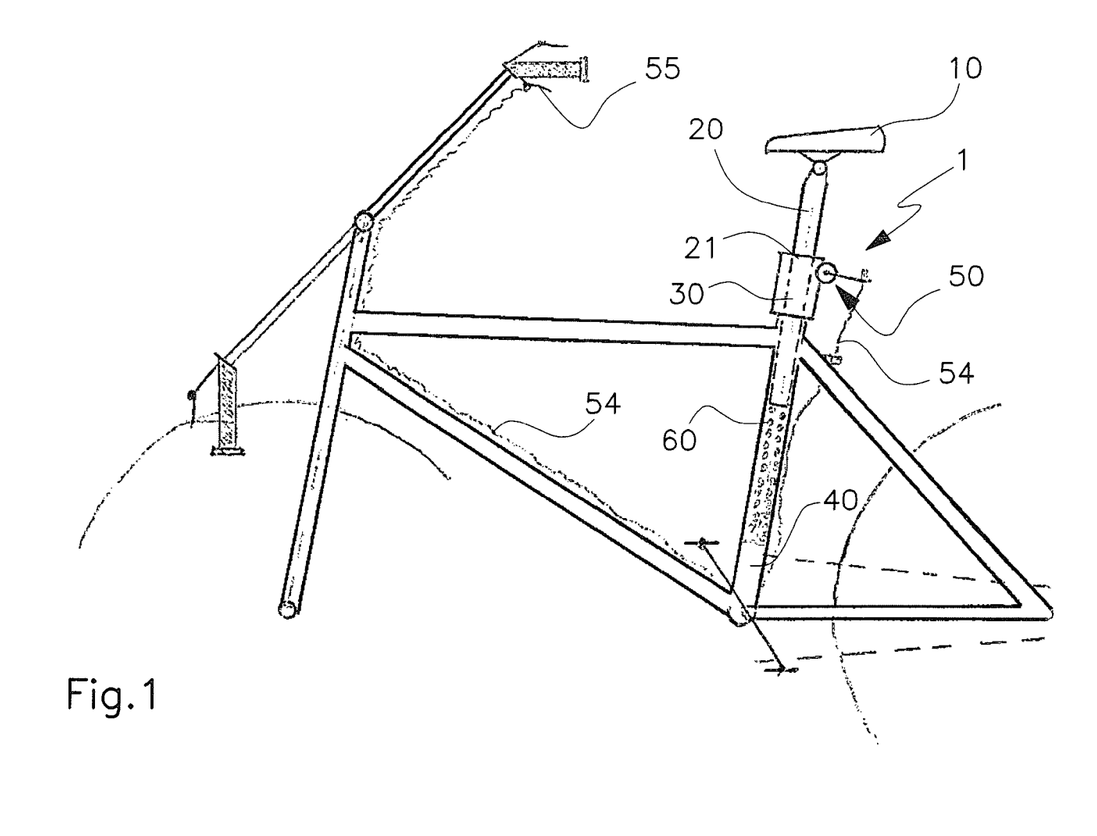
FIG. 1 shows a side view of a bicycle on which is installed a support for saddle according to the invention.

The support 1 provides an actuator member 60 suitable to exert a thrust force on the rod 20 in an axial direction, directed upwards. The actuator member 60 is housed inside the frame 40, under the end portion 21 of the rod 20. The actuator member 60 can comprise elastic means, for example a spring (see FIG. 1). It is also possible to provide other embodiments of the invention, not illustrated, wherein the actuator member 60 comprises, as an example, high pressure gas pneumatic devices (gas spring), pressurized oil devices, or electric actuators.

Further, the support 1 provides a blocking member 50, associated with said lower support element 30 and suitable to fix the position of the rod 20 in a configuration chosen by the cyclist.

Figure 8:
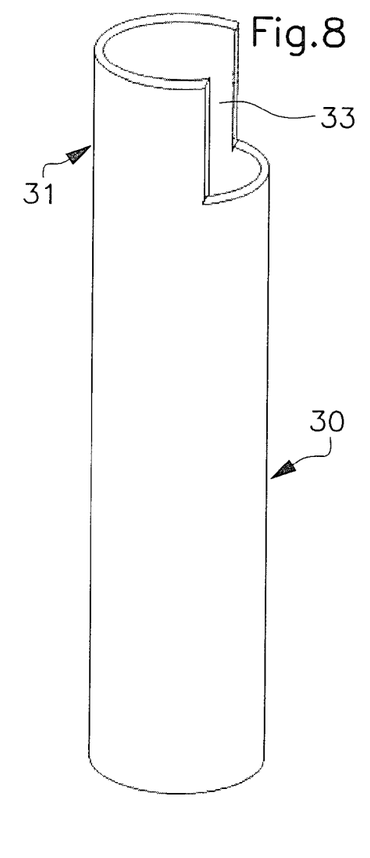
FIG. 8 shows an axonometric view of a particular embodiment of the lower support.
Figure 9:
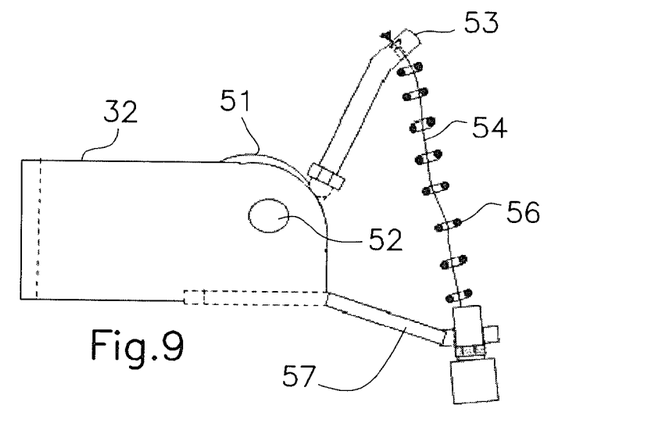
FIG. 9 shows a side view of a particular embodiment of the blocking member 50, arranged in the first blocking position.
Figure 9A:
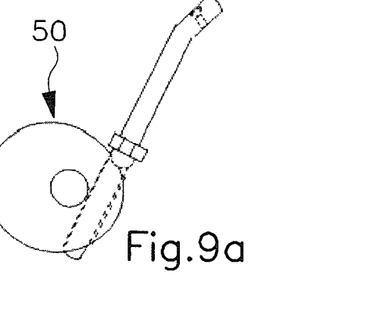
FIG. 9a shows a detail of the blocking member 50, illustrated in FIG. 9.
Figure 10:
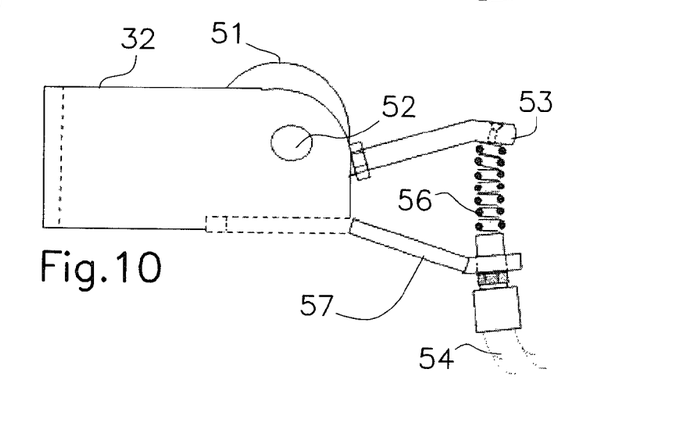
FIG. 10 shows a side view of a particular embodiment of the blocking member 50, arranged in the second disengagement position.
Figure 11:
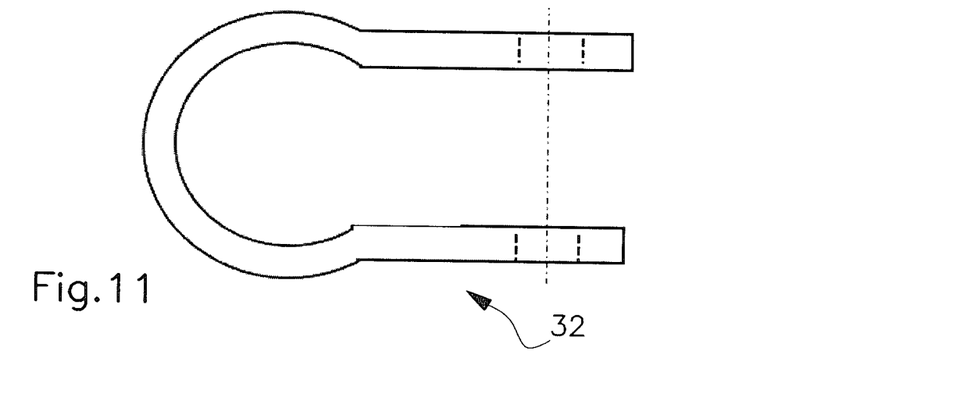
FIG. 11 shows a plan view of the stirrup 32.
Figure 12:
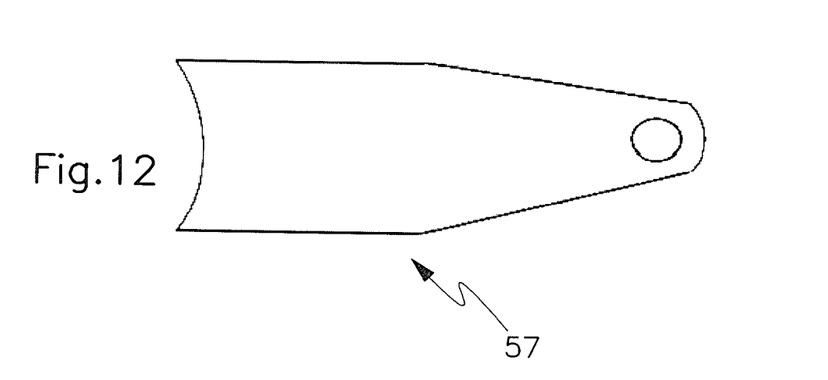
FIGS. 12 and 13 respectively show a plan view and a side view of the arm 57.
Figure 13:
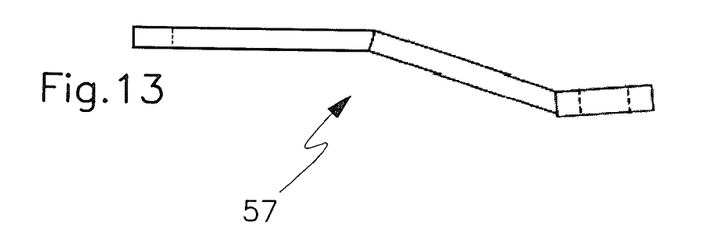
Figure 15:
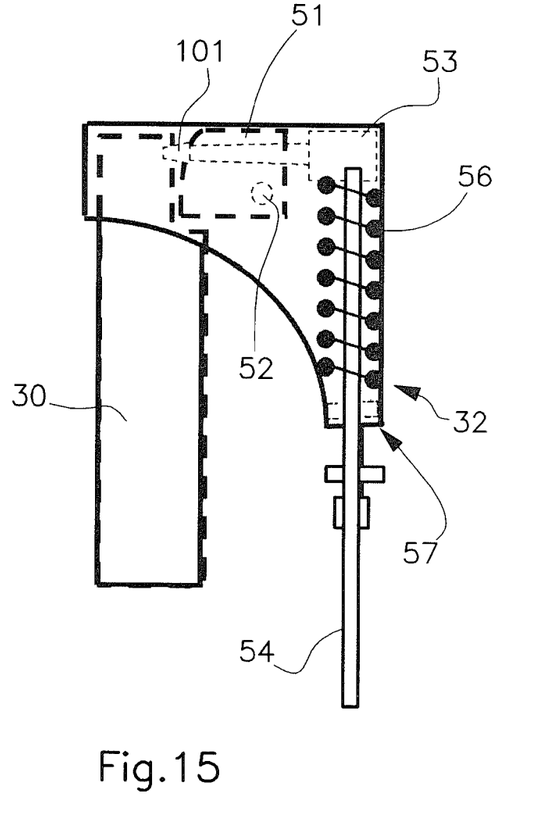
FIG. 15 shows a side view of a particular embodiment of the blocking member 50, arranged in the first blocking position.

The blocking member 50 comprises a tilting body 51 hinged on an eccentric longitudinal axis 52, carried overhang on said lower support element 30 through a stirrup 32. The stirrup 32 is preferably sealed at the top of the lower support 30 (FIG. 8, 15). Alternatively, in the bicycles equipped with a frame prearranged for the invention, it is possible to provide that the stirrup 32 is directly sealed at the top of the frame 40 (FIG. 17b).

The body 51 is suitable to rotate about the axis 52 between a first blocking position, wherein the surface of the body 51 is in contact with the rod 20, through an opening 33 practiced laterally in the lower support element 30, and a second disengagement position, wherein the surface of the body 51 is spaced from the rod 20.

Figure 2:
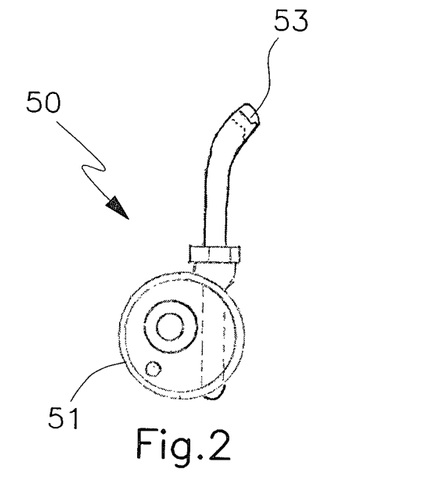
FIG. 2 shows a side view of the blocking member according to the invention.
Figure 3:
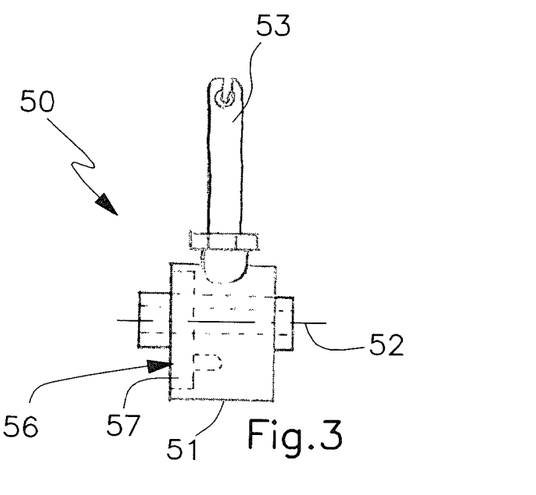
FIG. 3 shows a front view of the blocking member according to the invention.
Figure 4:
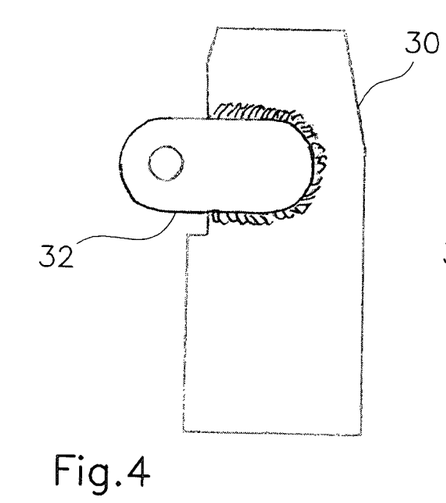
FIG. 4 shows a side view of the lower support.
Figure 5:
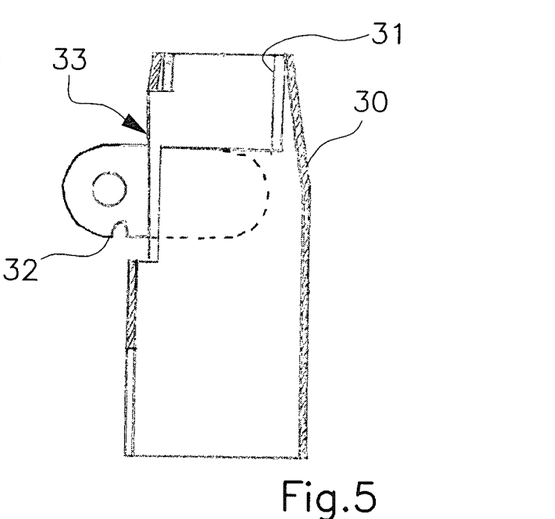
FIG. 5 shows a section view of the lower support.

The blocking member 50 also provides actuator means 56, for example a spring. In an embodiment of the invention, the spring 56, of the circular type, is placed in a housing 57 obtained laterally between the body 51 and the stirrup 32, and is suitable to exert a torque at the rotation axis 52, in order to take and keep the body 51 in the aforesaid first blocking position (FIGS. 2 and 3).

The blocking member 50 is provided with a driving member 53 radially hinged on the body 51 and suitable to control the rotation thereof between said first and second position.

The driving member 53, for example a lever, is connected to countermeans 54, for example a metal small cable, which enables the driving thereof at a distance, as an example by means of a control lever 55 installed on the handle of the bicycle, in proximity of one the grips.

In a different embodiment of the invention, the actuator means 56 are constituted by a linear spring, placed in between the lever 53 and a fixed abutment point 57, for example an arm connected at the lower part of the stirrup 32, or an appendix of the same stirrup 32. In such an embodiment, the linear spring 56 can usefully house, at its own inside, the end portion of the countermeans 54.

The tilting body 51, in a preferred embodiment of the invention, comprises an interference member 101 which extends in the direction of contact with the rod 20.

When the rod 20 lowers under the effect of the weight of the cyclist, the interference member 101 is engaged in one of the holes 100 present on the surface 21a of the rod 20. Thereafter, the interference member 101 drags and guides the rotation of the body 51 also in presence of play between the surface 21a of the rod 20 and the surface 103 of the body 51.

The interference member 101 can be usefully shaped by a protruding end of the driving member 53.

Figure 16A:
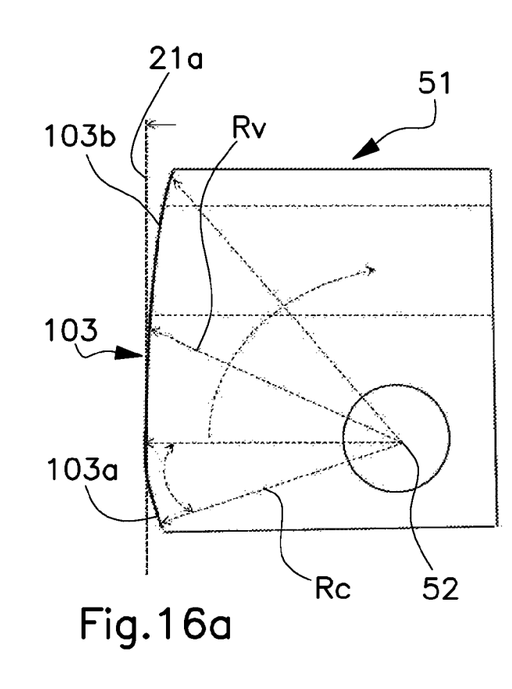
FIGS. 16a, 16b, 16c show respective schematic side views of the profile with varying radius of curvature of the tilting body 51 set in the blocking position, respectively in three operating conditions wherein no play is present between the body 51 and the rod 20; wherein a small play is present (for example 1 mm); wherein a bigger play is present (for example 2 mm)
Figure 16B:
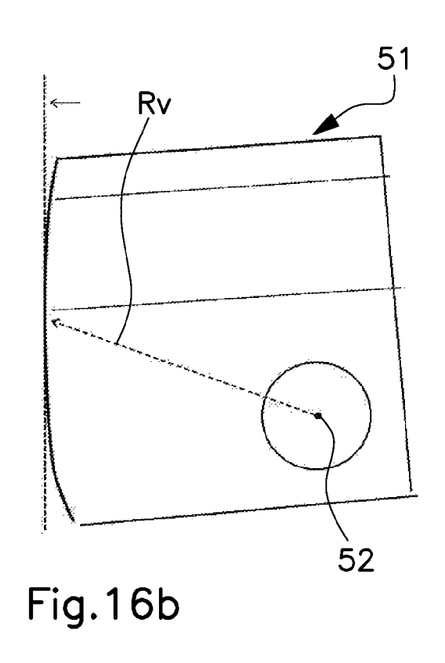
Figure 16C:
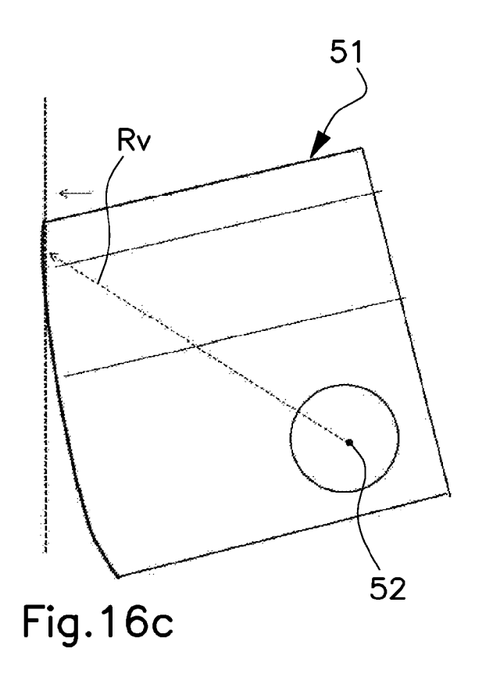

The tilting body 51 has usefully a lateral contact surface 103 with a varying profile (i.e. not uniform), illustrated in FIGS. 16a, 16b, 16c. In particular, the surface 103 comprises a first lower portion 103a, located under a substantially horizontal plane passing by the rotation axis 52 when the body 51 is in the blocking position. The first lower portion 103a shapes a curved surface having a constant radius of curvature Rc, for example 15 mm.

The surface 103 then comprises a second upper portion 103b, located above a substantially horizontal plane passing by the rotation axis 52 when the body 51 is in the blocking position. The second upper portion 103b shapes a curved surface having a radius or curvature Rv increasing between the aforesaid plane passing by the axis 52 and the upper edge of the body 51. For example, the radius of curvature can increase of 1-2 mm between the initial section and the end section of the second upper portion 103b.

The operating functioning of the support for bicycle saddle object of the invention is described in the following.

When the cyclist envisages raising the position of the sitting, he unloads the saddle from his own weight standing up on the pedals, and acts on the control lever 55. Then, the body 51 rotates, under the action of the lever 53, moving from the first blocking position to the second disengagement position.

In this step, the body 51 rotates clockwise about the axis 52, taking the first lower portion 103a into contact with the surface 21a of the rod 20, then the rotation continues until the respective surfaces 21a and 103a separate. The rotation of the body 51 also determines the disengagement of the interference member 101, if present, from the respective hole 100.

In practice, when the body 51 is in the first blocking position, the rod 20 is tightened in position, preventing the axial movement thereof. Vice versa, when the body 51 is in the second disengagement position, the rod 20 is free to axially slide.

Consequently, upon the thrust exerted by the actuator member 60, the saddle goes to a raised position. When the cyclist releases the control lever 55, the stress exerted by the spring 56 takes the body 51 back in the above said first blocking position, immobilizing the saddle 10 in the new raised arrangement.

Vice versa, when the cyclist envisages to lower the position of the sitting, as an example during the braking before a stop, he acts on the control lever 55 to unblock the device as previously described, then he loads his own weight on the saddle. In this case, since the weight of the cyclist is bigger than the contrast force exerted by the actuator member 60, after the body 51 has moved to the second disengagement position, the saddle goes to a lowered position. Thereafter, when the cyclist releases the control lever 55, the stress exerted by the spring 56 takes the body 51 back into the aforesaid first blocking position, immobilizing the saddle 10 in the new lowered arrangement, cooperating with the interference member 101 as previously described.

In particular, it is to be pointed out that the innovative conformation of the body 51, equipped with a surface having a varying profile (i.e. not uniform), advantageously allows to block in position the rod 20 also when a play is present between the body 51 and the surface 21a.

For example, FIGS. 16b and 16c respectively illustrate the configuration which is taken by the device when it is in the blocking position, in the case wherein is present a play respectively equal to approximately 1 mm and to approximately 2 mm.

In particular it is to be observed that if it was used a body 51 equipped with a cylindrical contact surface having a constant radius of curvature, of the type commonly used in devices of known type, in the case wherein is present a play between the contact surface of the body 51 and the surface 21a, the blocking device could fail to get a grip, because of the over reduced radius of curvature. Vice versa, if it was used a surface provided with a constant radius of curvature but having a bigger value, able to get a grip also in presence of play between the surfaces, the drawback of no managing to unblock with ease the device taking it in the disengagement position would take place.

Moreover, the innovative idea of associating the described blocking device, functioning thanks to the friction between the surfaces in contact, with an interference member 101 able to engage respective seats 100 on the mobile rod 20, enables to ensure that the device is correctly dragged and guided in rotation also in presence of play between the surfaces.

It is furthermore to be observed that the end of stroke in extraction of the rod 20 is easily ensured by beating between the washer 102 and the lower edge of the lower support element 30, the washer having a diameter barely lower than the internal diameter of the frame 40. Alternatively, in the case of a frame designed specifically for the invention, and therefore not provided with the lower element 30 separately inserted, the end of stroke in extraction is ensured by a small bolt inserted in the lower hole 100 of the rod 20. In this case, the head of the small bolt abuts against the tilting element and then limits the extraction of the rod 20. To this scope, it is provided that the lower hole 100 is suitably threaded. The end of stroke in introduction will be, in both cases, ensured by the clamp of the saddle.

The support for bicycle saddle according to the invention therefore reaches the scope of allowing the cyclist to perform in a fast and efficient manner the adjustment of the height of the sitting of the cyclist while the vehicle is moving.

A feature of the invention in hand consists in that it provides a device which has a simple building conception, provided with a reliable functioning, rarely subject to wear and tear, and therefore adapted to the use also in bicycles of cheap type.

The apparatus described for indicative purposes is susceptible of numerous modifications and variants according to the diverse exigencies.

As an example, it is possible to provide the prearrangement of customizable end of stroke, able to suitably limit the stroke of the rod 20.

In practice, the embodiment of the invention, the materials used, as well as the shape and dimensions, may vary depending on the requirements.

Should the technical characteristics mentioned in each claim be followed by reference signs, such reference signs were included strictly with the aim of enhancing the understanding the claims and hence they shall not be deemed restrictive in any manner whatsoever on the scope of each element identified for exemplifying purposes by such reference signs.

The invention claimed is:

1. A support for bicycle saddle, comprising:
    a support rod, connected, at an upper part thereof, to the saddle and engaged slidingly in a lower support element, rigidly fixed or integrally shaped by a bicycle frame;
    an actuator member suitable to exert a thrust force on the rod in an axial direction, said actuator member being housed internally to said bicycle frame, in a lower part with respect to the rod;
    a blocking member, associated with said lower support element and suitable to fix a position of said rod in a configuration chosen by a cyclist, said blocking member comprising a tilting body pivoted on an eccentric longitudinal axis, said body being suitable to rotate about said eccentric longitudinal axis between a first blocking position, wherein a surface of said tilting body is in contact with said rod, at a contact surface of said rod, through an opening in said lower support element, and a second disengagement position, wherein the surface of said tilting body is spaced from said rod, said blocking member further comprising an actuator means for exerting a stress at said eccentric longitudinal axis, in order to take and keep said tilting body in the first blocking position, said contact surface comprising a curvilinear profile having a varying radius of curvature, said surface comprising a first lower portion, located under a substantially horizontal plane passing by said eccentric longitudinal axis when said tilting body is in said blocking position, said first lower portion having a curvilinear profile having a constant radius of curvature, said surface comprising a second upper portion, located above the substantially horizontal plane passing by said eccentric longitudinal axis when said tilting body is in said blocking position, said second upper portion having a curvilinear profile having an increasing radius of curvature.

2. A support according to claim 1, wherein said radius of curvature of said second upper portion increases between said horizontal plane passing by said eccentric longitudinal axis and an upper edge of said tilting body.

3. A support according to claim 1, wherein said tilting body comprises an interference member which extends in a direction of contact with said contact surface of said rod, said interference member being suitable to engage a corresponding seat obtained in said contact surface to drag and guide rotation of said tilting body.

4. A support according to claim 1, wherein said rod comprises a tubular portion having a polygonal section.

5. A support according to claim 1, wherein said rod comprises a tubular portion which shapes, in section, a circular segment.

6. A support according to claim 4, wherein said lower support element shapes a tubular sleeve, and has internally, in an upper part thereof, a tubular sleeve profile, complementary to a profile of said tubular portion, wherein an end portion of said tubular portion is suitable to be engaged slidingly in said tubular sleeve profile.

7. A support according to claim 1, wherein said actuator member comprises elastic means of a spring type.

8. A support according to claim 3, wherein said blocking member is provided with a driving member pivoted in a radial manner on said tilting body and suitable to control rotation thereof between said first blocking position and said second disengagement position.

9. A support according to claim 8, wherein said interference member is shaped by an end portion of said driving member.

10. A support according to claim 8, wherein said actuator means comprises a linear spring, interposed between said driving member and a fixed abutment point.

11. A support according to claim 8, wherein said driving member is linked to a countermeans, which allow driving thereof at a distance through a control lever installed on a handle of the bicycle.

12. A support according to claim 11, wherein said actuator means is housed inside an end portion of said countermeans.

* * * * *